US008554155B2

(12) United States Patent
Gobien

(10) Patent No.: US 8,554,155 B2
(45) Date of Patent: Oct. 8, 2013

(54) MATCHING CIRCUIT FOR A MULTI-BAND ANTENNA AND MULTI-BAND RADIO INCORPORATING THE SAME

(75) Inventor: Andrew Gobien, Mount Airy, MD (US)

(73) Assignee: Thales Communications, Inc., Clarksburg, MD (US)

( * ) Notice: Subject to any disclaimer, the term of this patent is extended or adjusted under 35 U.S.C. 154(b) by 353 days.

(21) Appl. No.: 13/005,340

(22) Filed: Jan. 12, 2011

(65) Prior Publication Data

US 2011/0195705 A1 Aug. 11, 2011

Related U.S. Application Data

(60) Provisional application No. 61/294,356, filed on Jan. 12, 2010.

(51) Int. Cl.
*H04B 1/38* (2006.01)

(52) U.S. Cl.
USPC ......... 455/73; 455/188.2; 455/83; 455/575.7; 455/67.11; 455/575.5; 343/700 MS; 343/702; 343/895

(58) Field of Classification Search
USPC ......... 455/73, 188.2, 83, 575.7, 67.11, 575.5; 343/700 MS, 702, 895, 772; 444/715, 444/785
See application file for complete search history.

(56) References Cited

U.S. PATENT DOCUMENTS

| | | | | |
|---|---|---|---|---|
| 5,852,603 A * | 12/1998 | Lehtinen et al. | .............. | 370/280 |
| 5,896,562 A * | 4/1999 | Heinonen | ....................... | 455/76 |
| 6,107,970 A * | 8/2000 | Holshouser et al. | .......... | 343/702 |
| 6,292,144 B1 * | 9/2001 | Taflove et al. | ................ | 343/702 |
| 6,449,264 B1 * | 9/2002 | Lehtinen et al. | .............. | 370/328 |
| 6,734,825 B1 * | 5/2004 | Guo et al. | .............. | 343/700 MS |
| 7,057,565 B1 * | 6/2006 | Liu | ........................ | 343/700 MS |
| 7,257,380 B2 * | 8/2007 | Darabi et al. | ................... | 455/73 |
| 7,443,350 B2 * | 10/2008 | Gaucher et al. | ............... | 343/702 |
| 7,589,678 B2 * | 9/2009 | Perunka et al. | ............... | 343/702 |
| 7,724,204 B2 * | 5/2010 | Annamaa et al. | ............. | 343/906 |
| 7,965,242 B2 * | 6/2011 | Abramov et al. | ............. | 343/702 |
| 2008/0102760 A1 * | 5/2008 | McConnell et al. | ............ | 455/73 |

* cited by examiner

*Primary Examiner* — Marceau Milord
(74) *Attorney, Agent, or Firm* — Arent Fox LLP

(57) ABSTRACT

A device for multiple band frequency communication may include a chassis, a transceiver for receiving and transmitting voice and data communications over any one of multiple frequency bands, an antenna assembly comprising a single radiator and an antenna matching unit, and an antenna connector provided on the chassis for mounting the antenna assembly to the device and connecting the antenna assembly to the transceiver via a transmission line, wherein the antenna matching unit is provided between the radiator and the antenna connector and comprises a reactive circuit to filter the communications and transform an impedance between the radiator and the antenna connector to match an impedance between the transceiver and the antenna connector for each of the multiple frequency bands. A method and system is disclosed for communicating voice and data communications over multiple frequency bands.

20 Claims, 8 Drawing Sheets

MATCHING CIRCUIT FOR A MULTI-BAND ANTENNA AND MULTI-BAND RADIO INCORPORATING THE SAME

RELATED APPLICATIONS

This application claims the benefit of and priority to U.S. Provisional Patent Application No. 61/143,959, filed Jan. 12, 2009, and is related to U.S. patent application Ser. No. 12/362,123 entitled Device, Method, and System for Multiple Frequency Band Communication, filed Jan. 29, 2009, the entire contents of each of the previous applications being incorporated herein by reference.

BACKGROUND

1. Field

Aspects of the present invention generally relate to multi-mode antennas, and more particularly, to a matching circuit for matching the impedance of separate frequency bands using a single antenna.

2. Introduction

Emergency management is a difficult task. The lack of sufficient communication among necessary parties in emergency situations only exacerbates the problems. Unfortunately, interoperability issues are prevalent among first responders from different agencies and/or jurisdictions. For example, federal government officials may be unable to communicate and effectively share information with state, local and/or other jurisdictions. Additionally, responders from the fire department, for example, may be unable to effectively communicate and/or share information with police department responders.

While radio spectrum within several frequency bands has been reserved by the Federal Communications Commission (FCC) for public safety use, most emergency response radios were built to operate within a single radio band. Thus, multiple users in different frequency bands often use different wavelengths. To communicate with each other, users are often required to carry multiple single-band portable radios to achieve interoperability with other agencies.

Therefore, there exists an unmet need in the art for a single handheld radio capable of communicating over multiple public safety and/or other frequency bands.

SUMMARY

According to an aspect of the present invention, a device for multiple band frequency communication includes a chassis, a transceiver for receiving and transmitting voice and data communications over any one of multiple frequency bands, an antenna assembly comprising a single radiator and an antenna matching unit, and an antenna connector provided on the chassis for mounting the antenna assembly to the device and connecting the antenna assembly to the transceiver, wherein the antenna matching unit is provided between the radiator and the antenna connector and comprises a reactive circuit to filter the communications and transform an impedance between the radiator and the antenna connector to match an impedance between the transceiver and the antenna connector for each of the multiple frequency bands According to another aspect of the present invention, a method of multiple band frequency communications via a hand-held device comprising a transceiver, a radiator, and an antenna connector includes measuring an S-parameter of the radiator for each of the multiple frequency bands, configuring an antenna matching unit to filter the communications and transforming an impedance between the radiator and an antenna connector to match an impedance between the transceiver and the antenna connector for each of the multiple frequency bands, connecting the configured antenna matching unit between the radiator and the antenna connector, and transmitting or receiving the communications via the single radiator for the multiple frequency bands.

According to a further aspect of the present invention, a system for communicating voice and data communications over multiple frequency bands includes means for receiving and transmitting voice and data communications via an antenna assembly over any one of the multiple frequency bands, wherein the antenna assembly comprises a radiator and an antenna matching unit, means for determining a return loss value of the radiator in each of the multiple frequency bands; and means for filtering the voice and data communications to a predetermined impedance for the radiator based on the return loss value in each of the multiple frequency bands.

It is understood that other aspects of the invention will become readily apparent to those skilled in the art from the following detailed description, wherein various aspects of the present invention are shown and described by way of illustration only. As will be understood, the present invention is capable of other and different variations and its several details are capable of modification in various other respects, all without departing from the scope of the invention. Accordingly, the drawings and detailed description are to be regarded as illustrative in nature and not as restrictive.

DETAILED DESCRIPTION

Aspects of the present invention address the above-identified needs, as well as others, via a multi-band antenna, and a portable handheld radio incorporating said antenna that covers multiple frequency bands, such as some or all of the public safety bands. For example, the radio may be capable of communicating in the VHF range (136-174 MHz), the UHF range (380-520 MHz), and in the 700 and 800 MHz bands (763-870 MHz) using a single wire radiator.

Figure 1:
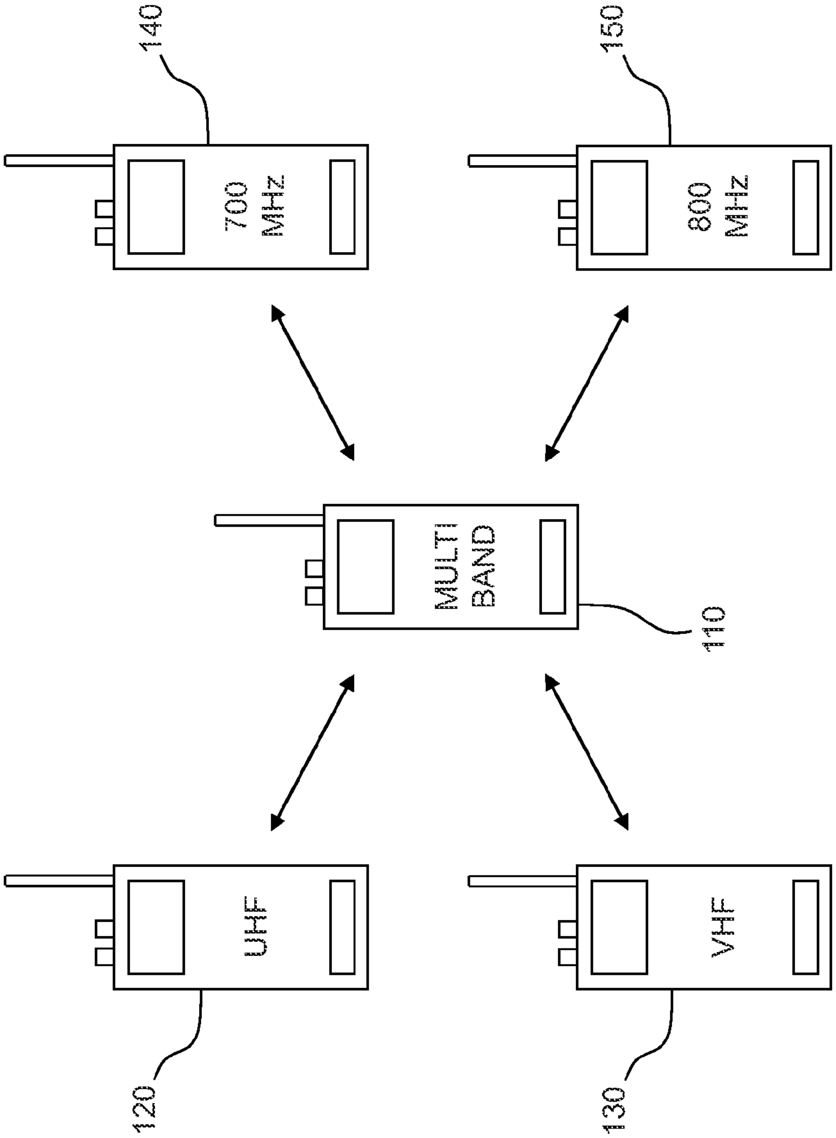
FIG. 1 depicts a device in representative operation, in accordance with some aspects of the present invention.

Referring now to FIG. 1, a multi-band radio 110 receives and transmits voice and/or data communications over VHF, UHF, 700 MHz, and 800 MHz frequency bands. The multi-band radio 110 is thus able to communicate with radios 120, 130, 140, and 150, which are limited to communication only within their respective frequency bands (VHF, UHF, 700 MHz, and 800 MHz).

Figure 2B:
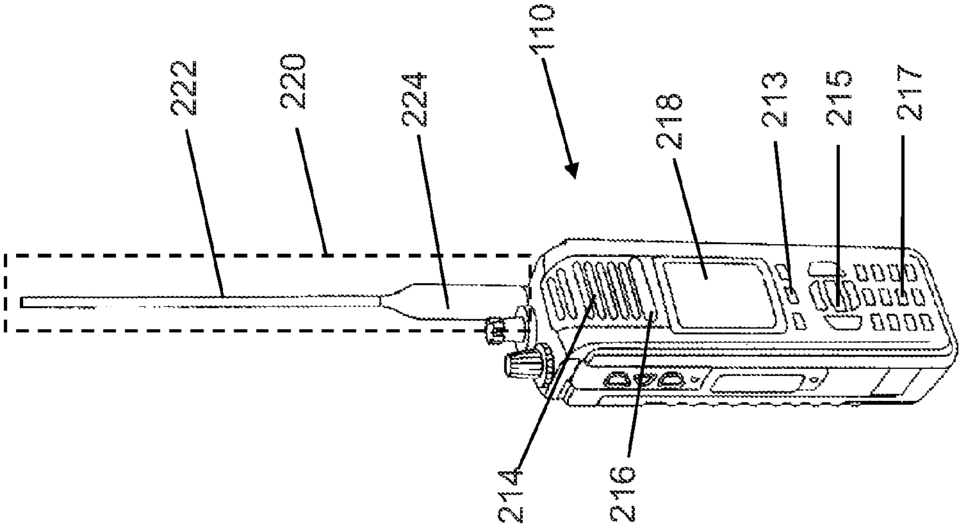
FIG. 2B depicts an example of a multi-band antenna and portable handheld radio, in accordance with some aspects of the present invention.
Figure 2A:
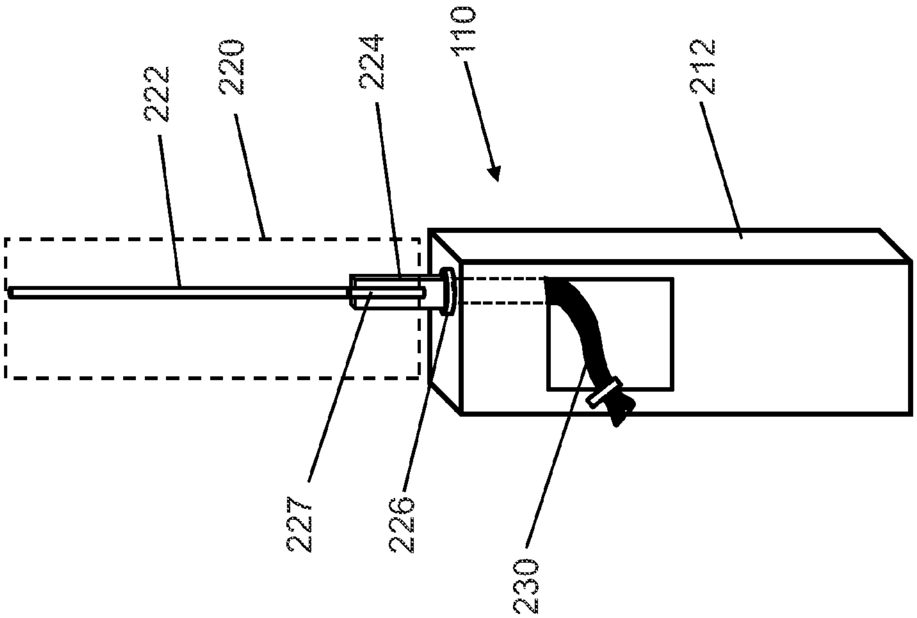
FIG. 2A depicts an example of an antenna assembly connected to an empty chassis of a multi-band antenna and portable handheld radio, in accordance with some aspects of the present invention.

Referring now to FIGS. 2A and 2B, there is shown an example of a portable handheld multi-band radio 110 having connected thereto a monopole antenna assembly 220. FIG. 2A shows an empty chassis 212 with an antenna connector 226 for connecting an RF transmission line 230, which may be a coaxial cable, for example, between transceiver elements of the multi-band radio 110 and the antenna assembly 220. The monopole antenna assembly 220 includes a radiator 222 and an antenna matching unit 224. An antenna connector 226 may connect the monopole antenna assembly 220 to the portable multi-band radio 110. Radiator 222 may be a piece of conducting wire or a speedometer cable received into a radial radiator bushing 227, for example, which may be provided on an upper surface of the antenna matching unit 224 for press fitting the radiator 222 to connect with the antenna matching unit 224. A power amplifier drives currents onto the radiator, which create fields that radiate. According to some aspects, the radiator may be coated in a material such that the resulting radiator is a flexible, plastic-coated piece of wire. Current returns from the radiator to the power amplifier via a ground plane, for example. According to some aspects, the ground plane may be the chassis 212 of the radio to which the radiator is connected. Thus, the antenna ports may come up out of the radio through the ground plane. The antenna matching unit 224 may be placed between the radiator 222 and the antenna connector 226, for example.

While antenna assembly 220 has been described above as a monopole antenna assembly having a ground plane, it is noted that other radiators may also be used. For example, a sleeve dipole radiator, an inverted-F radiator, a planar inverted-F radiator, and/or other radiators fabricated using wire (i.e., thin conducting radiators) may be used. Additionally, helical radiators may also be used. A helical antenna may be a monopole antenna wherein the wire is twisted into a spring of some diameter and pitch.

FIG. 2B shows exemplary aspects of the multi-band radio 110 in a final assembled state. The multi-band radio 110 may include a speaker 214 and a microphone 216 for audio output and input. Programmable soft-key buttons 213 may be configured to activate a feature or function displayed immediately above them on a display 218. The display 218 may be a color Quarter Video Graphics Array (QVGA) liquid crystal display (LCD) having a 320×240 pixel resolution with integrated backlighting, or any other type of suitable display. The display 218 can also be configured to provide a color-coded classification for different types of users/agencies. In particular, when a multi-band radio in accordance with aspects of the present invention is tuned to a channel of a specific agency, the color display may be configured to display the name of that agency in a color that corresponds to the type and/or function of that agency. For example, the names of channels corresponding to law enforcement agencies may be displayed in blue, fire departments in red, forestry departments in green. Color-coded classification allows users multi-band radios in accordance with aspects of the present invention to quickly determine the types of agencies each channel corresponds to. Additional entries shown on the display 218 may be accessed by scrolling through the selections using navigation buttons 215. The navigation buttons 215 may be used to navigate around the display 218 and highlight displayed icons or fields. The navigation buttons 215 may include an "enter" button or other selection mechanism that may be used to select a highlighted feature, which, for example, may be a menu, a programming option, or other function as programmed into the radio 110. It should be noted that the features on the display 218 may be programmed to select any programmable function of the radio 110. Keypad 217 may be used to enter alpha-numeric characters and symbols similar to other communication devices, such as mobile telephones.

The antenna matching unit 224 may include a reactive circuit which transforms the impedance of the radiator over to 50 ohms to match the 50 ohms at the antenna port provided to the power amplifier. More particularly, the antenna matching unit may be configured to provide isolation between one or more of the multiple frequency bands and to provide an impedance match at the antenna connector 226 of approximately 2:1 VSWR into 50 ohms, which may maximize efficiency and battery life of the radio.

According to some aspects, the antenna assembly may be compact in size. For example, the antenna assembly may be about 8 inches in length. Additionally, the antenna may be configured such that the gain is substantially the same as that of existing narrow-band antennas.

Figure 3:
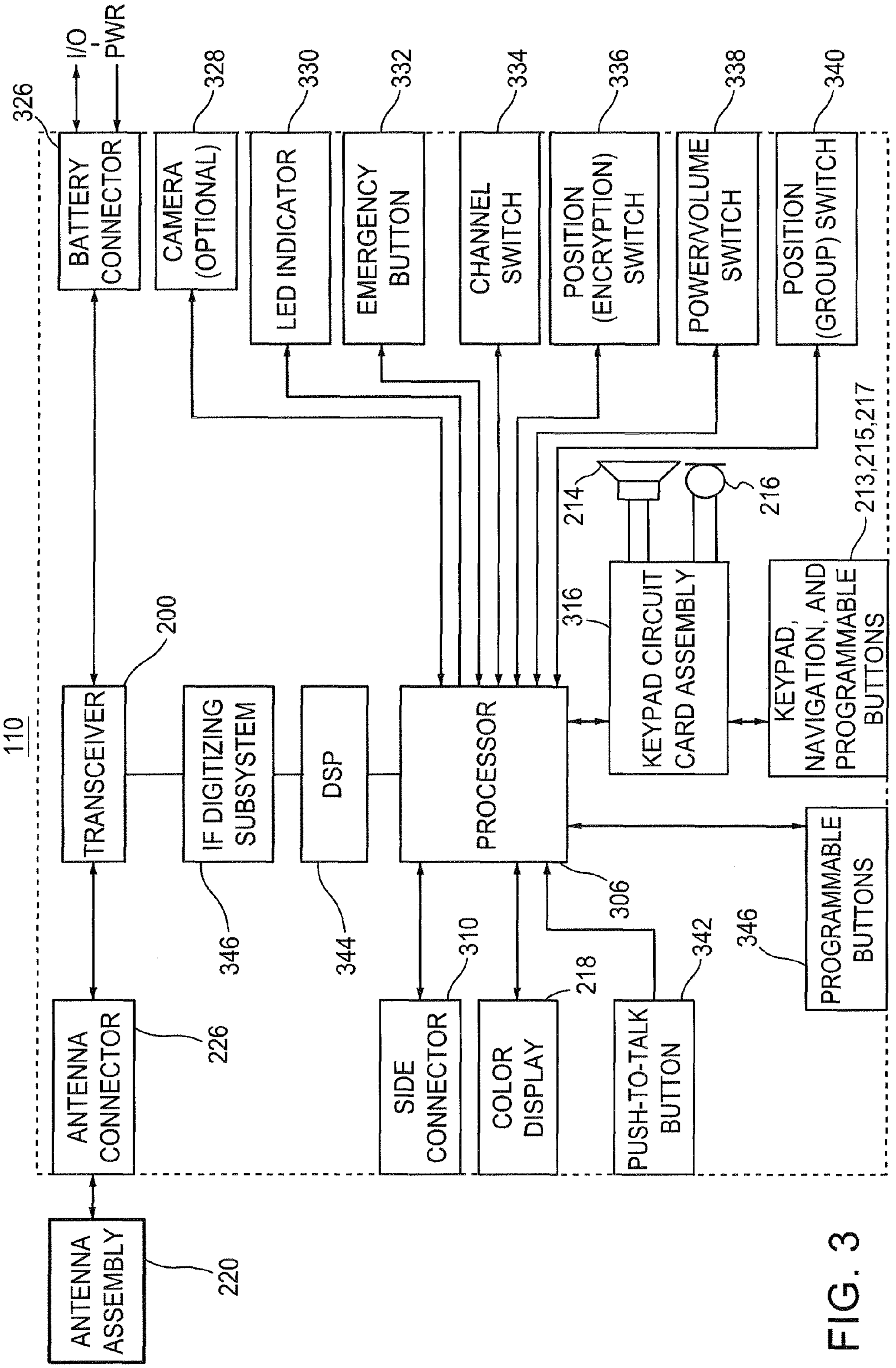
FIG. 3 is an exemplary system diagram depicting a simplified interconnection scheme of internal external components for a multi-band communication device, in accordance with aspects of the present invention.

FIG. 3 is a system block diagram that shows a simplified interconnection scheme between various internal and external components of the device 110, in accordance with aspects of the present invention. For example, in addition to aspects of the present invention discussed above, the device 210 may include a channel switch 334, a position (encryption) switch 336, a position (group) switch 338, a power/volume switch 338, programmable buttons 314, an LED indicator 330; a push-to-talk button 342; a side connector 310; a programmable (emergency) button 332; and battery connector 326.

In addition to the above components, the multi-band radio 110 may include an optional camera 328, for example, for capturing images and/or video for storage and transmission. The camera 328 may be a charge coupled device (CCD) or a complementary metal oxide semiconductor (CMOS) images sensor, or any other suitable image sensor.

In accordance with aspects of the present invention, most of the components of the multi-band radio 110 are shown to interface with processor 306 either directly or indirectly. The processor 306 may be a general purpose processor (GPP) configured to receive and transmit communications and execute various kinds of instructions. The speaker 214, microphone 216, and programmable, navigation, and keypad buttons, 213, 215 and 217, respectively, interface with the processor 306 via a keypad circuit card assembly 316, which may include, among other things, a backlight for the keypad and circuitry configured to detect and transmit communications to and from the speaker 214 and microphone 216, respectively.

Further, as shown in FIG. 3, the multi-band radio 110 may include a digital signal processor (DSP) 344 and an intermediate frequency (IF) digitizing subsystem 346 for processing communications to the transceiver 200 and/or other components of the multi-band radio 110. The transceiver 200 may be configured to receive and transmit voice and/or data communications over VHF, UHF, 700 MHz, and 800 MHz frequency bands via the antenna connector 226 and antenna assembly 220. The transceiver 200 is supplied with power from a battery (not shown) via a battery connector 326.

Figure 4:
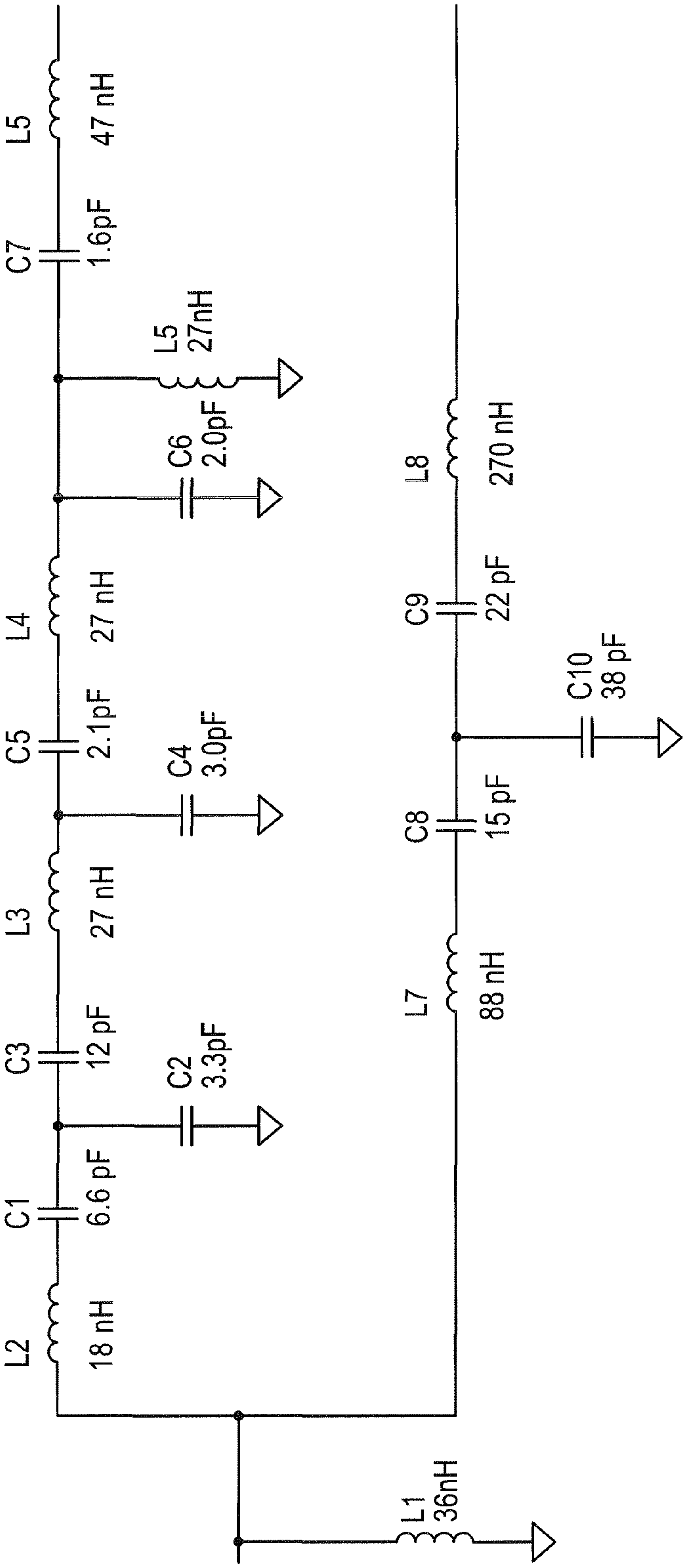
FIG. 4 is a schematic diagram depicting an antenna matching unit, in accordance with some aspects of the present invention.

FIG. 4 depicts an exemplary antenna matching circuit, in accordance with aspects of the present invention. The antenna matching circuit may comprise two bandpass filters configured in parallel to supply the impedance match, creating a bandpass diplexer filter. As depicted in FIG. 4, the filter uses only reactive components, resulting in low losses through the match. The losses in all bands are generally below 2 dB. According to some aspects of the present invention, the matching circuit may be produced using surface mount technology.

In accordance with some aspects of the present invention, in creating an impedance match, the antenna matching circuit may be configured to match the 50 ohms at the antenna port provided to the power amplifier to the S-parameters presented by the radiator. S-parameters may describe a one-port or a two-port circuit, for example. An S-parameter S11, for example, may describe the amount of power reflected back from the input circuit, which may also be referred to as the "return loss." For example, a −20 dB return loss (S11) indicates that 100 times less power is reflected by the input port than is put in. An identically defined parameter, S22, may be measured for the output port. Another S-parameter, S21, may describe the gain or loss between the input and output ports and S-parameter S12 may describe the gain or isolation in the other direction.

In the one-port system described herein, reflection is measured. The amount of power reflected by the radiator is measured to determine S11, and this value may be used to derive impedance. Given a power amplifier which provides 50 ohms, no reflective power arises when there is a matched impedance of 50 ohms off the antenna port. The antenna matching circuit may be configured to change the impedance of the wire in the given bands to 50 ohms, as desired by the power amplifier.

Figure 5:
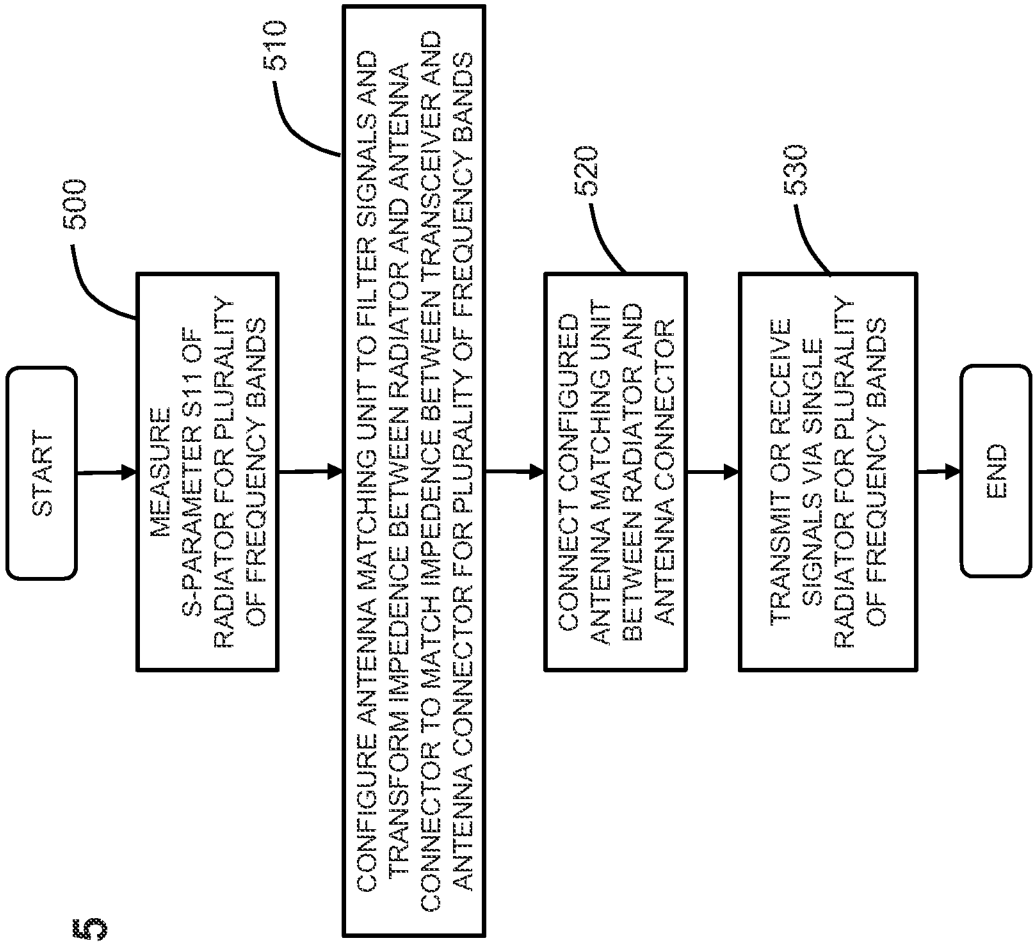
FIG. 5 is a flow diagram of a method of communicating voice and/or data communications over multiple frequencies, in accordance with some aspects of the present invention.

A method of matching the impedance between an antenna connector and a radiator is shown in FIG. 5. The S-parameters S11 of the radiator 222 are first measured 500 for each of the desired frequency bands. In accordance with some aspects of the present invention, the S-parameters S11 may be measured for the each of the public safety bands—UHF, VHF, and 700-800 MHz frequency bands. Based on the obtained S-parameter measurements, the antenna matching unit 224 may be configured to filter the voice and/or data communications between the radiator 222 and the antenna connector 226 to match the impedance, 50 ohms for example, of the communications between the transceiver 200 and the antenna connector 226 for each of the multiple frequency bands 510. For example, the components of the antenna matching circuit shown in FIG. 4 (i.e., the inductors and the caps for each of the parallel bandpass filters), may be configured to exhibit the desired impedance to the antenna connector 226 based on the measured S-parameters S11 of the radiator 222. The configured antenna matching unit 224 may then be connected 520 between the radiator 222 and the antenna connector 226. With the configured antenna matching unit 224 thus connected, the multi-band radio 110 may be used to transmit or receive 530 voice and/or data communications over the single radiator 222 for each of the desired frequency bands.

Figure 6B:
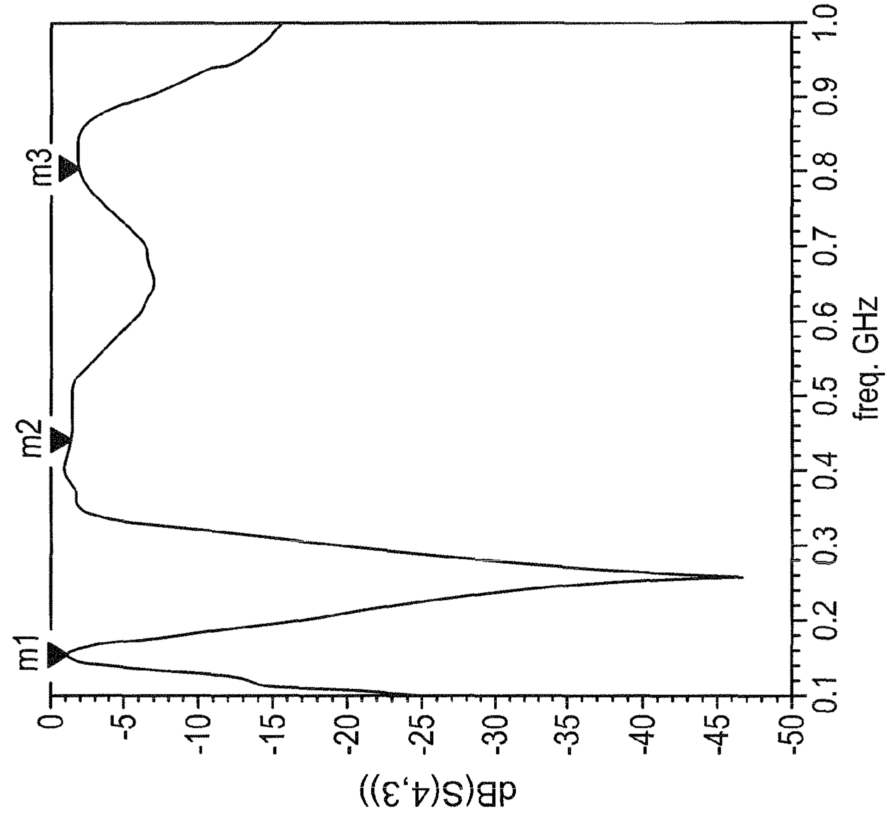
FIG. 6B is a graph depicting the losses resulting form the antenna matching depicted in FIG. 6A, in accordance with some aspects of the present invention.
Figure 6A:
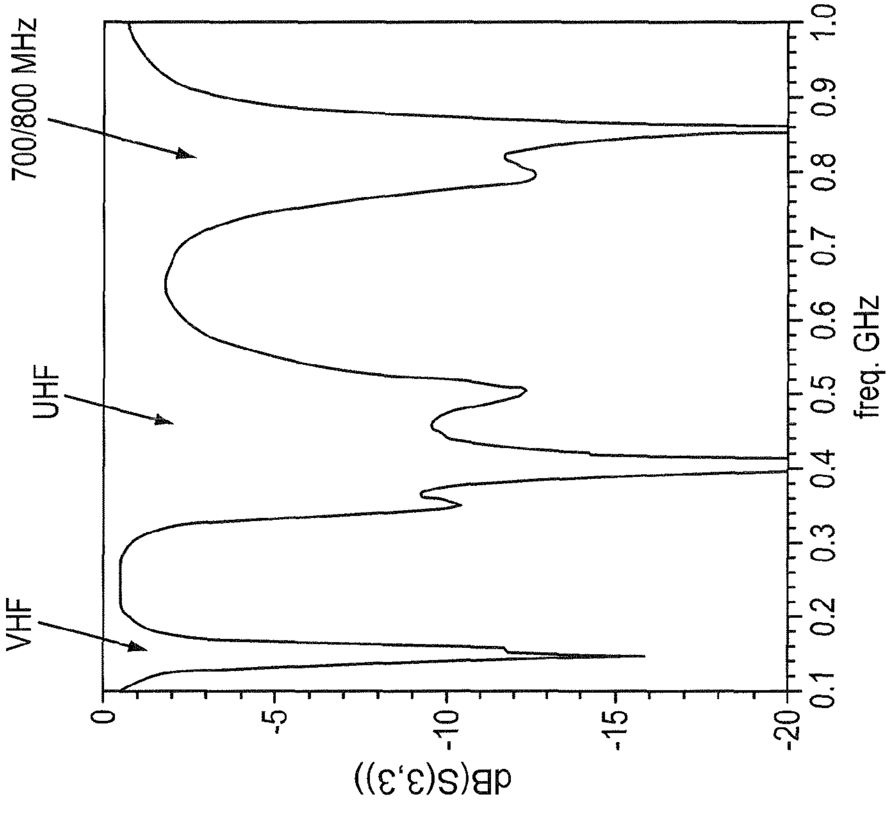
FIG. 6A is a graph depicting the results of an antenna matching, in accordance with some aspects of the present invention.

FIG. 6A graphically illustrates exemplary results of an antenna matching process in accordance with aspects of the present invention. As depicted in FIG. 6A, applying a pair of bandpass filters configured in parallel (e.g., a bandpass diplexer filter) results in an antenna match among the VHF, UHF and 700/800 frequency bands. Moreover, FIG. 6B depicts exemplary approximate losses through the antenna matching process described herein. As indicated in FIG. 6B, the exemplary losses are less than 2 dB for each frequency range.

In some aspects of the present invention, a printed circuit board may be used to fabricate the antenna matching circuit described herein, wherein the printed circuit board may have, for example, a width of about 0.315 inches, a length of about 1.34 inches, and a substrate thickness of about 0.031 inches.

According to some aspects of the invention, the multi-band antenna described herein may be designed by creating a "TRL" calibration kit. The calibration kit may be used to calibrate measuring instrument for measuring the S-parameters of the antenna over each frequency band.

According to some aspects, each of the multiple frequency bands may be individually matched. For example, a highpass filter may be used to match a VHF band, a lowpass filter for a UHF band, and a bandpass filter for the 700/800 MHz band. Other filter configurations may also be used.

Aspects of the present invention can also be programmed and upgraded to include or restrict different features, access various different frequencies and talk groups, perform different functions, include authorization codes to access various levels of functionality, etc. Programming can be performed using a PC or other terminal having a processor and input capability via a wired connection, blue tooth, WiFi, or other ranged wireless techniques.

Aspects of the present invention provide a programming interface displayed on a programming terminal that includes a simulation of the color display of the aspect being programmed. The simulation can be displayed in a portion of a screen of a terminal being used to program the aspect. The simulation of the color display can provide the programmer with a preview of the appearance of the programmed content on the color display. For example, via the simulation, the programmer can preview the appearance (color, font, size, length, etc.) of text representing a color-coded channel name. The simulation of the color display thus allows the programmer to more accurately gauge the appearance of content on the color display, and determine whether the appearance meets various functional and/or aesthetic design requirements.

Aspects of the present invention can also include an animated multi-layered menu system that the user can navigate via on-board controls and the color display.

Aspects of the present invention may be directed to some or all of the P25 Class A requirements, including the Inter RF Subsystem Interface (ISSI). ISSI is an interface that enables RF subsystems (RFSSs) built by different manufacturers to be connected together into wide area networks. The wide area network connections using the ISSI may provide an extended coverage area for roaming subscriber units. The extended coverage area is important for public safety first responders that provide assistance in other jurisdictions during an emergency.

Figure 7:
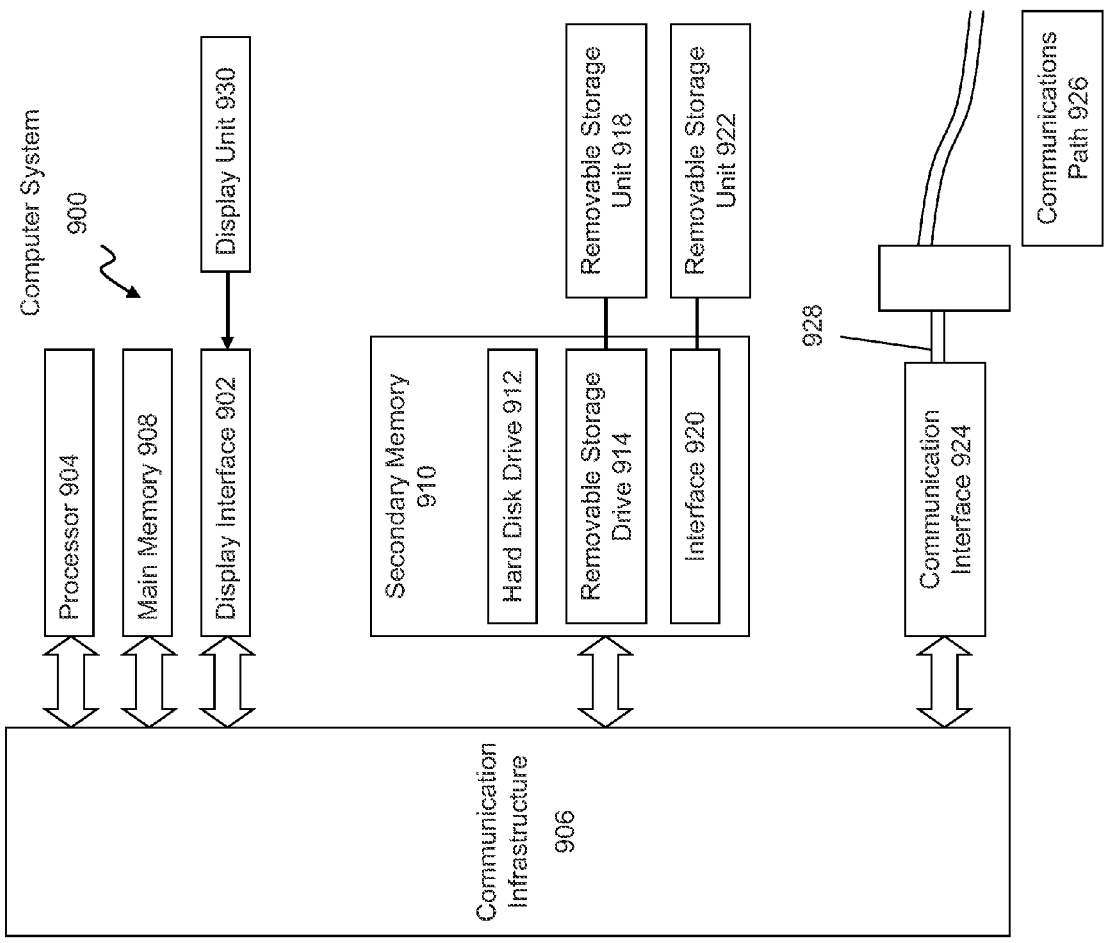
FIG. 7 is a block diagram of various exemplary system components, in accordance with some aspects of the present invention.

Aspects of the present invention, as well as programming functions performed via a separate terminal, may be implemented using hardware, software, or a combination thereof and may be implemented in one or more computer systems or other processing systems. In one aspect, the invention is directed toward one or more computer systems capable of carrying out the functionality described herein. An example of such a computer system 900 is shown in FIG. 7.

Computer system 900 includes one or more processors, such as processor 904. The processor 904 is connected to a communication infrastructure 906 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RE) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an aspect where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 8:
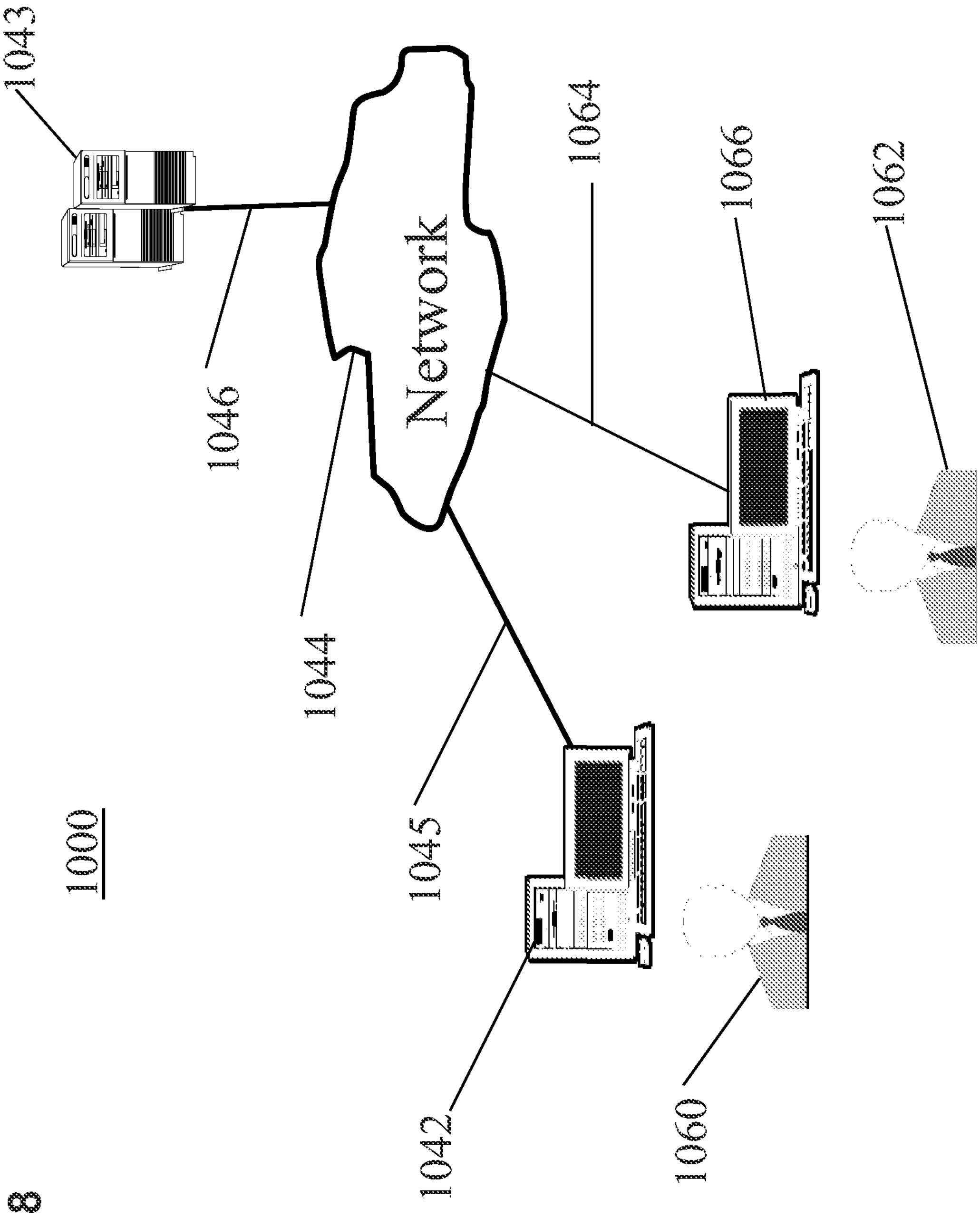
FIG. 8 is an exemplary flow chart of a method performed in accordance with aspects of the present invention.

FIG. 8 shows a communication system 1000 usable in accordance with the present invention. The communication system 1000 includes one or more accessors 1060, 1062 (also referred to interchangeably herein as one or more "users") and one or more terminals 1042, 1066. In one aspect, data for use in accordance with the present invention (e.g., data to be used with a terminal for programming a radio in accordance with aspects of the present invention) is, for example, input and/or accessed by accessors 1060, 1064 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another aspect, the method and system of the present invention operate in a stand-alone environment, such as on a single terminal.

While the present invention has been described in connection with preferred aspects, it will be understood by those skilled in the art that variations and modifications of the preferred aspects described above may be made without departing from the scope of the invention. Other aspects will be apparent to those skilled in the art from a consideration of the specification or from a practice of the invention disclosed herein.

What is claimed is:

1. A device for multiple band frequency communication comprising:

a chassis;

a transceiver for receiving and transmitting voice and data communications over any one of multiple frequency bands;

an antenna assembly comprising a single radiator and an antenna matching unit; and an antenna connector provided on the chassis for mounting the antenna assembly to the device and connecting the antenna assembly to the transceiver;

wherein the antenna matching unit is provided between the radiator and the antenna connector and comprises a reactive circuit to filter the communications and transform an impedance between the radiator and the antenna connector to match an impedance between the transceiver and the antenna connector for each of the multiple frequency bands.

2. The device for multiple band frequency communication of claim 1, wherein the multiple frequency bands comprise VHF, UHF, 700 MHz, and 800 MHz frequency bands.

3. The device for multiple band frequency communication of claim 1, wherein the antenna assembly is a monopole antenna assembly having a ground plane.

4. The device for multiple band frequency communication of claim 3, wherein the ground plane is the chassis, 5. The device for multiple band frequency communication of claim 1, wherein the antenna matching unit is configured to provide isolation between each of the multiple frequency bands and an impedance match at the antenna connector of approximately 2:1 voltage standing wave ratio (VSWR) into 50 ohms.

6. The device for multiple band frequency communication of claim 5, wherein the antenna matching unit further comprises an antenna matching circuit comprising two bandpass filters configured in parallel to supply the impedance match for each of the multiple frequency bands.

7. The device for multiple band frequency communication of claim 6, wherein each of the two bandpass filters is configured to establish an impedance match based on a predetermined S-parameter measurement of the radiator in each of the multiple frequency bands.

8. The device for multiple band frequency communication of claim 6, wherein the antenna matching circuit is configured on a printed circuit board.

9. The device for multiple band frequency communication of claim 8, wherein the antenna matching unit further comprises a radial radiator bushing interfaced with the printed circuit board, wherein the radiator makes pressure contact to the bushing.

10. A method of multiple band frequency communications via a hand-held device comprising a transceiver, a radiator, and an antenna connector, the method comprising:

measuring an S-parameter of the radiator for each of the multiple frequency bands;

configuring an antenna matching unit to filter the communications and transforming an impedance between the radiator and an antenna connector to match an impedance between the transceiver and the antenna connector for each of the multiple frequency bands;

connecting the configured antenna matching unit between the radiator and the antenna connector;

and transmitting or receiving the communications via the single radiator for the multiple frequency bands.

11. The method of claim 10, further comprising:

configuring the antenna matching unit to provide isolation between each of the multiple frequency bands and an impedance match at the antenna connector of approximately 2:1 voltage standing wave ratio (VSWR) into 50 ohms.

12. The method of claim 11, wherein the antenna matching unit comprises:

an antenna matching circuit comprising two bandpass filters configured in parallel to supply the impedance match for each of the multiple frequency bands.

13. The method of claim 12, further comprising:

configuring each of the two bandpass filters to establish the impedance match based on the predetermined S-parameter measurement of the radiator in each of the multiple frequency bands.

14. The method of claim 11, wherein the antenna matching circuit is configured on a printed circuit board.

15. The method of claim 14, further comprising:

providing a radial radiator bushing to interface the radiator with the printed circuit board, wherein the radiator is fitted to establish pressure contact with the bushing.

16. A system for multiple frequency band communications comprising:

means for receiving and transmitting voice and data communications via an antenna assembly over any one of the multiple frequency bands, wherein the antenna assembly comprises a radiator and an antenna matching unit;

means for determining a return loss value of the radiator in each of the multiple frequency bands; and means for filtering the voice and data communications to a predetermined impedance for the radiator based on the return loss value in each of the multiple frequency bands.

17. The system of claim 16, wherein the antenna matching unit provides isolation between each of the multiple frequency bands and the predetermined impedance matches an impedance between an antenna connector and the means for receiving and transmitting voice and data communications.

18. The system of claim 16, wherein the predetermined impedance is 50 ohms.

19. The system claim of 18, further comprising means for fitting the radiator to the antenna matching unit.

20. A computer program product comprising a computer usable medium having control logic stored therein for causing a computer to transmit communications over multiple frequency bands via a hand-held device comprising a transceiver, a radiator and an antenna connector, the control logic comprising:

computer readable program code means for measuring an S-parameter of the radiator for each of the multiple frequency bands and configuring an antenna matching unit to transform an impedance between the radiator and an antenna connector to match an impedance between the transceiver and the antenna connector for each of the multiple frequency bands.

* * * * *